(12) United States Patent
Larsen et al.

(10) Patent No.: US 6,810,428 B1
(45) Date of Patent: Oct. 26, 2004

(54) METHOD OF OPERATION OF A MULTI-STATION NETWORK

(75) Inventors: Mark Sievert Larsen, Pretoria (ZA); James David Larsen, Pretoria (ZA)

(73) Assignee: IWICS Inc., Bothell, WA (US)

( * ) Notice: Subject to any disclaimer, the term of this patent is extended or adjusted under 35 U.S.C. 154(b) by 0 days.

(21) Appl. No.: 09/445,033

(22) PCT Filed: Jun. 5, 1998

(86) PCT No.: PCT/GB98/01651

§ 371 (c)(1),
(2), (4) Date: Jan. 18, 2000

(87) PCT Pub. No.: WO98/56140

PCT Pub. Date: Dec. 10, 1998

(30) Foreign Application Priority Data

Jun. 6, 1997 (ZA) .............................. 97/5022

(51) Int. Cl.[7] ........................................... G06F 15/177
(52) U.S. Cl. ...................... 709/238; 709/239; 709/240; 709/241; 709/242; 709/243; 709/244; 709/223; 370/238
(58) Field of Search ............................... 709/242, 238, 709/241, 231, 232, 235, 240, 224, 225; 370/238, 254, 255, 256

(56) References Cited

U.S. PATENT DOCUMENTS

| 4,864,563 A | | 9/1989 | Pavey | 370/94.1 |
|---|---|---|---|---|
| 4,930,118 A | * | 5/1990 | Sugihara | 370/227 |
| 5,430,729 A | | 7/1995 | Rahnema | 270/94.1 |
| 5,485,578 A | * | 1/1996 | Sweazey | 709/224 |
| 5,793,975 A | * | 8/1998 | Zeldin | 709/224 |
| 6,282,170 B1 | * | 8/2001 | Bentall et al. | 370/225 |
| 6,335,919 B1 | * | 1/2002 | Maegawa | 370/254 |

OTHER PUBLICATIONS

Dube et al., "Signal Stability–Based Adaptive Routing (SSA) for Ad Hoc Mobile Networks" IEEE Personal Communications, vol. 4, No. 1, Feb. 1997, pp. 36–45.*

Dube, R. et al., "signal Stability–Based Adaptive Routing (SSA) for Ad Hoc Mobile Networks". *IEEE Personal Communications*, Feb. 1997, pp. 36–45.

Albanese, A. et al. "A Routing Strategy for Interconnecting High–Speed Metropolitan Area Networks". *Computer Communication Technologies for the 90's*, Tel Aviv, Oct. 30, 1998, pp. 303–309.

* cited by examiner

*Primary Examiner*—Glenton B. Burgess
*Assistant Examiner*—Kevin Parton
(74) *Attorney, Agent, or Firm*—Ladas & Parry LLP

(57) ABSTRACT

The invention provides a method of operating a communication network. The network comprises numerous stations, each of which can transmit and receive data in order to transmit messages from originating stations to destination stations opportunistically via intermediate stations. Each station selects one of a number of possible calling channels to transmit probe signals to other stations. The probe signals contain data identifying the station in question and include details of its connectivity to other stations. Other stations receiving the probe signals respond directly or indirectly, thereby indicating both to the probing station and other stations their availability as destination or intermediate stations. The probing station evaluates the direct or indirect responses to identify other stations with which it can communicate optimally. For example, the stations may monitor the cumulative power required to reach another station, thereby defining a power gradient to the other stations, with stations selecting a route through the network which optimizes the power gradient. Thus, data throughput through the network is maximized with minimum interference and contention between stations.

30 Claims, 7 Drawing Sheets

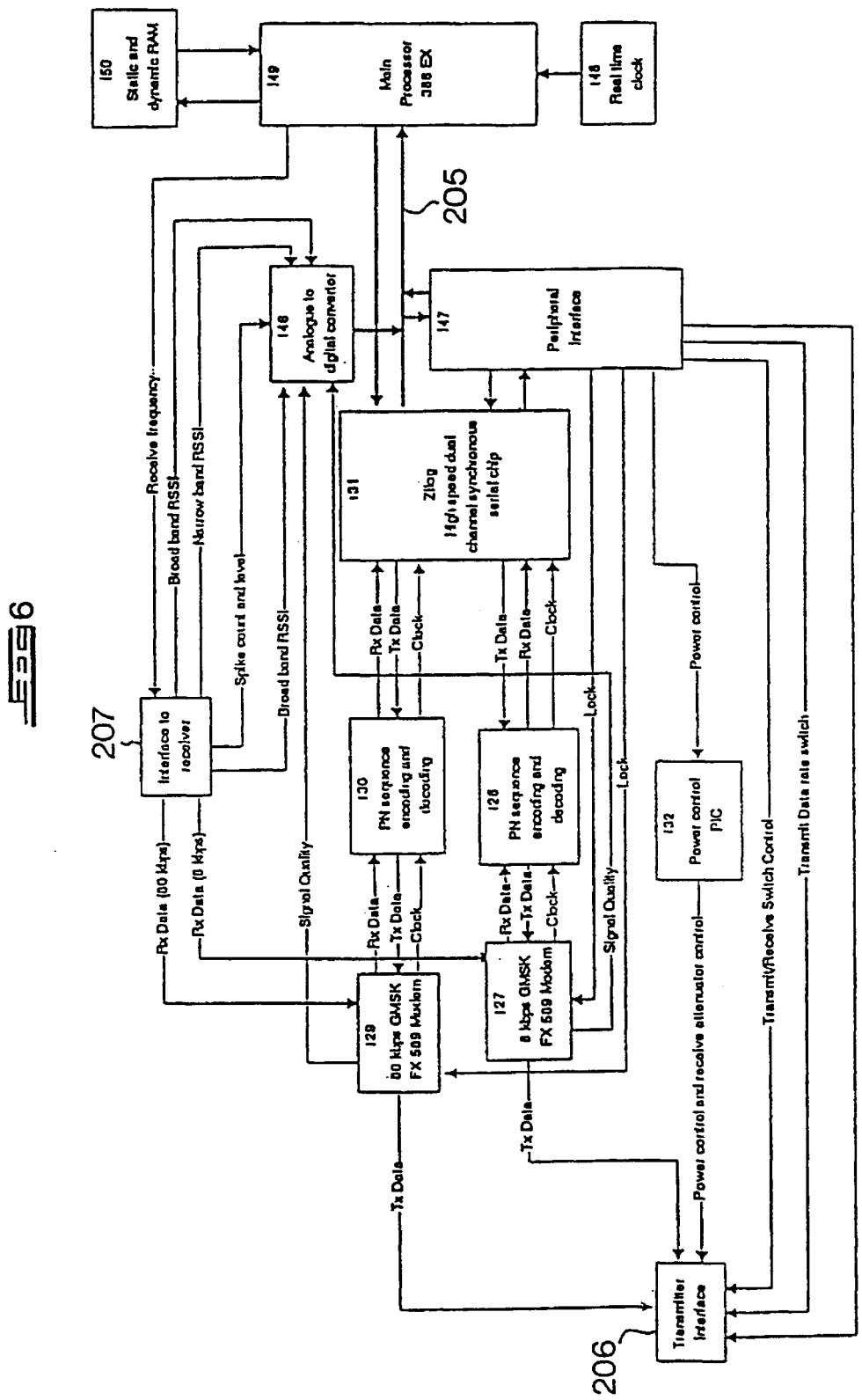

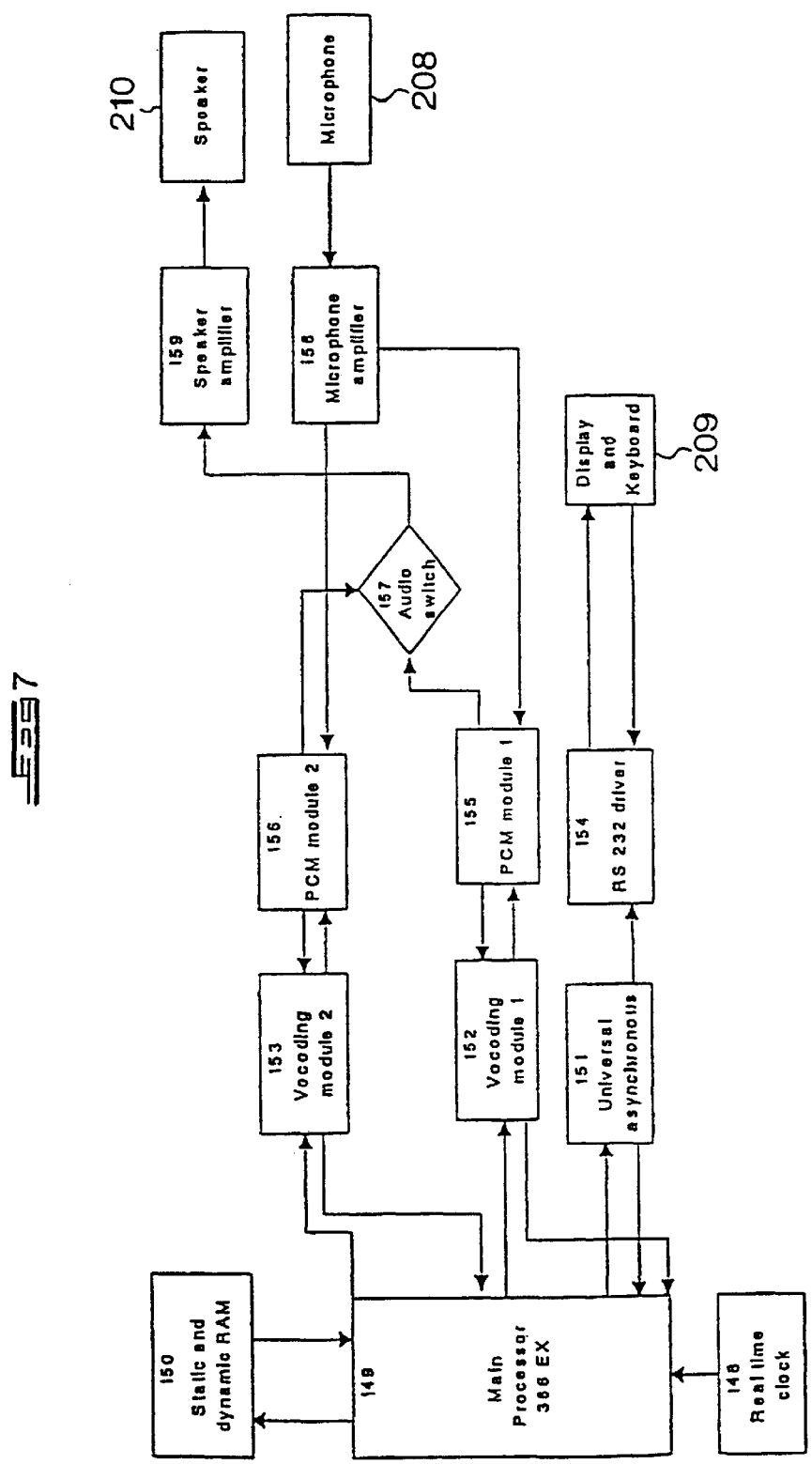

METHOD OF OPERATION OF A MULTI-STATION NETWORK

BACKGROUND OF THE INVENTION

THIS invention relates to a method of operating a multi-station communication network, and to a network employing the method.

International patent application no. WO 96/19887 describes a communication network in which individual stations in the network can send messages to other stations by using intermediate stations to relay the message data in an opportunistic manner.

In order to be in a position to send a new message out into the network via a selected one of several possible intermediate stations, or to relay a message onward in the same manner, each station must at any time normally be in contact with several other stations.

To optimise the operation of a network of this kind, the interaction of the individual stations must be regulated according to predetermined criteria, in order to minimise contention or interference between stations while at the same time maximising data throughput at minimum transmission power.

It is an object of the invention to provide a method of operating a multi-station communication network which regulates the connectivity between stations in order to optimise the operation of the network.

SUMMARY OF THE INVENTION

According to the invention there is provided a method of operating a communication network comprising a plurality of stations each able to transmit and receive data so that the network can transmit data from an originating station to a destination station via at least one intermediate station, the method comprising:

a) defining at least one calling channel;

b) selecting, at each station and according to first predetermined criteria, a calling channel for the transmission of probe signals to other stations;

c) transmitting probe signals from each station on the selected calling channel, other stations which receive the probe signals from a given station responding directly or indirectly to thereby indicate to the given station their availability as destination or intermediate stations; and d) evaluating, at the given station, the direct or indirect responses of other stations to said probe signals according to second predetermined criteria, in order to identify other stations with which the given station can communicate optimally.

The other stations receiving the probe signals from the given station may each modify their own probe signals to include data indicating the quality of the communication between the given station and themselves, the given station being responsive to said data to vary at least one parameter of its transmissions so that it can communicate optimally with a desired number of other stations in the network without causing undue contention or interference between stations.

The probe signals from the given station may include data identifying other stations which said given station has detected as being available as destination or intermediate stations..

The probe signals may further include data indicating the quality of the communication between the given station and each other identified station.

The probe signals may be broadcast probe signals addressed to all or a plurality of the other stations.

The probe signals may additionally include addressed probe signals, addressed to at least one other station with which the station transmitting the addressed probe signals wishes to communicate.

The addressed probe signals are preferably transmitted more frequently than the broadcast probe signals.

Typically, the addressed probe signals include age information corresponding to the age of the data indicating the quality of the communication between the given station and each other identified station, for use by the station receiving the addressed probe signals in selecting other stations with which to communicate.

The probe signals may include power gradient information corresponding to the cumulative transmission power required for each identified station to reach those other identified stations with which said each identified station can communicate, for use by the station receiving the probe signals in selecting other stations with which to communicate.

The method may include transmitting chaser signals from an originating to a destination station, the chaser signals following multiple paths to the destination, thereby generating power gradient information usable by stations of the network in selecting a route for the transmission of data from the originating station to the destination station.

A gradient message may be transmitted from the destination station to the originating station, the gradient message including data corresponding to the cumulative power required to transmit a data message from the originating station to the destination station via an optimum route.

Preferably, all messages routed through the network include power gradient information corresponding to the cumulative transmission power required for the message to reach respective stations on its route through the network, thereby to permit optimised routing of messages through the network.

Stations receiving probe signals from the given station may respond by transmitting reply signals to the given station, the given station comparing the number of reply signals received from different stations with a predetermined value, and varying at least one parameter of its transmission if the number of reply signals does not correspond to the second value until the number of reply signals received by the given station corresponds to the predetermined value.

The method may include defining a plurality of calling channels, each calling channel except the first having a higher data rate than a previous calling channel and selecting a different calling channel having a different data rate from the previous calling channel according to the second predetermined criteria if the number of reply signals does not correspond to the predetermined value.

The first predetermined criteria may include the calling channel data rate and/or the calling channel transmission power, the calling channel being selected according to the highest available channel data rate and/or the lowest available channel transmission power.

The second predetermined criteria may include the calling channel data rate and/or the calling channel transmission power, the different calling channel being selected to have an incrementally lower channel data rate and/or an incrementally higher channel transmission power.

The predetermined value, which is compared with the number of reply signals, is preferably calculated to correspond to a desired number of neighbour stations available to a given station as intermediate or destination stations, to permit the given station to communicate optimally with a desired number of other stations in the network without causing undue contention or interference between stations.

The method may include defining a plurality of data channels, each data channel except the first having a higher data capacity than a previous data channel, each station transmitting data to neighbour stations on selected data channels after determining the availability of said neighbour stations.

The data channels may correspond to respective calling channels, a data channel being selected for transmission of data which corresponds to the selected calling channel.

In one version of the method, a plurality of data channels correspond to a single calling channel, the data channels being monitored for activity by the stations and a station wishing to transmit data selecting a data channel which has been detected as free of activity, thereby to optimise data channel usage between stations.

The probe signals transmitted by each station on the calling channels preferably include information indicative of the intention of a given station transmitting said probe signals to move to a selected data channel which is then flagged as being active, to permit other stations to communicate successfully with the given station on the selected data channel.

The probe signals may be transmitted regularly by stations attempting to establish contact with other stations, other stations receiving the probe signals responding to a random number of the probe signals, said random number being equal to or less than the number of probe signals transmitted.

The method preferably includes controlling, at each station, the interval between the transmission of probe signals by a probe timer, the probe timer defining an interval between successive probe signals which is longer than the duration of a probe signal, and transmitting response signals during periods between the successive probe signals.

The interval between the transmission of successive probe signals at each station may be varied according to whether or not the station has data to transmit, the probe timer defining a first, relatively short interval between successive probe signals when the station has data to send, and a second, relatively long interval between successive probe signals when the station has no data to send.

Designated important stations may transmit probe signals including data identifying them, other stations receiving these probe signals in turn modifying their own probe signals to include the data identifying the important stations, so that even stations remote from the important stations obtain said data.

The designated important stations may include, for example, gateway stations, certification authority stations and, from time to time, originating or destination stations.

The method may include distributing updated software for the operation of the stations by uploading the updated software to a selected station, and distributing portions of the updated software to other stations until each other station has the complete updated software.

The updated software is preferably distributed in update blocks including version data and block number data to permit stations to assemble the update software from a plurality of received update blocks.

Preferably, at least one of the update blocks includes timing data indicating a date and time at which the updated software must be used.

The invention extends to communication network comprising a plurality of stations each able to transmit and receive data so that the network can transmit data from an originating station to a destination station via at least one intermediate station, each of the stations operating in use to:

a) define at least one calling channel;

b) select, according to first predetermined criteria, a calling channel for the transmission of probe signals to other stations;

c) transmit probe signals to other stations on the selected calling channel, other stations which receive the probe signals from a given station responding directly or indirectly to thereby indicate to the given station their availability as destination or intermediate stations; and d) evaluate the direct or indirect responses of other stations to said probe signals according to second predetermined criteria, in order to identify other stations with which the given station can communicate optimally.

BRIEF DESCRIPTION OF THE DRAWINGS

FIG. 4 to 7 are block diagrams of hardware suitable for the implementation of the invention.

DESCRIPTION OF EMBODIMENTS

Figure 1:
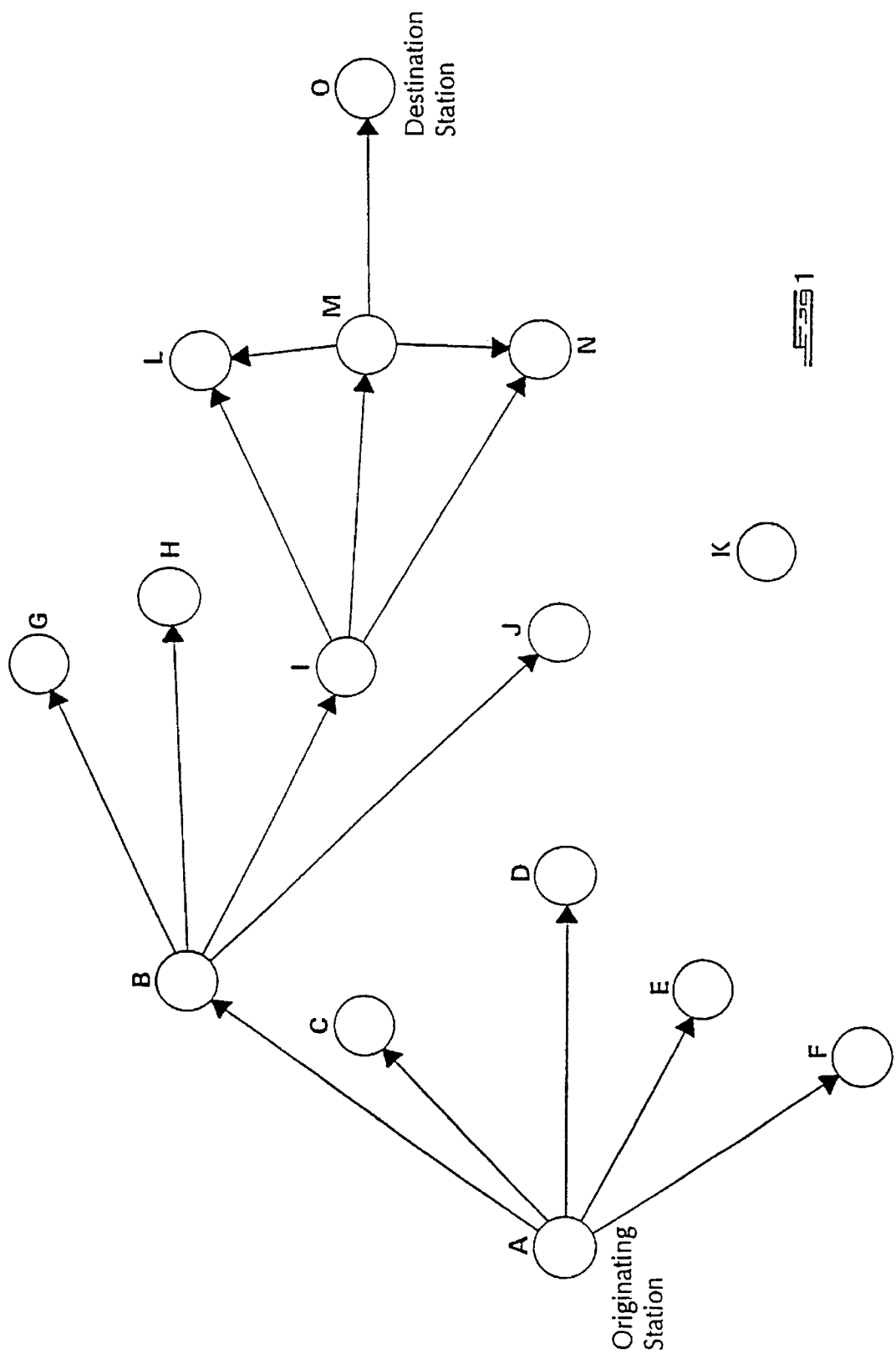
FIG. 1 is a schematic diagram of a multi-station communication network, indicating how an originating station can transmit data via a plurality of intermediate stations to a destination station.

The network illustrated schematically in FIG. 1 comprises a plurality of stations, each comprising a transceiver able to receive and transmit data from any other station within range. A communication network of this kind is described in PCT patent application no. WO 96/19887, the contents of which are incorporated herein by reference.

Although the abovementioned patent application describes a packet radio network it will be appreciated that the invention is applicable to other networks in which user stations can communicate with one another via intermediate stations in the network.

Networks of the kind referred to above can be utilised commercially, with users being subscribers who are billed for their use of the network. Alternatively, networks of this kind may be utilised by security forces such as police or military forces. These applications are given by way of example only.

In FIG. 1, an originating station A is able to communicate with five "nearby" stations B to F, and is transmitting data to a destination station O via intermediate stations B, I and M.

In order to maximise the efficiency of the network, it is desirable that each station should have a number of "neighbour" stations with which it can communicate, in case that station needs to send or receive a message. On the other hand, if a given station is transmitting data to a selected neighbour station, it is desirable that the transmission should cause the minimum of interference to other stations, otherwise the resulting contention between stations will reduce the amount of data throughput in the network.

With the above in mind, the present invention seeks to adjust the operation of each station so that it can at any time send data to or receive data from a number of neighbour stations, at the highest possible data rate but at the lowest possible transmitted power, thus reducing interference with other stations.

A communication network of the abovementioned kind comprises many stations trying to communicate on the same set of channels. The channels can be defined as having different frequencies, different media, different coding (eg. different spreading codes), different antennas, different time slots etc., or any combination of these. In order to optimise channel re-use, the invention provides for stations to try to maintain a limited number of immediate neighbours, typically 5 neighbours. A neighbour is defined as another station that a given station can communicate with.

A station can limit the number of neighbours it sees by changing its transmission frequency, changing code (PN Sequence), increasing its data rate, and dropping its transmit power. All stations will gather at predefined Calling Channels where they will find other stations to communicate with using a probe signal. Once another station is found and either of the stations have data to send they may then move to a less used Data Channel.

When there are a number of stations in close proximity they will end up using high data rates and low transmit powers. Stations will occasionally check the lower data rate Calling Channels to help any distant stations that cannot use the higher data rates. In the same way a station that is on a lower data rate Calling Channel will occasionally check all the data rates above its current data rate in order to find possible clusters of high data rate stations.

Figure 2:
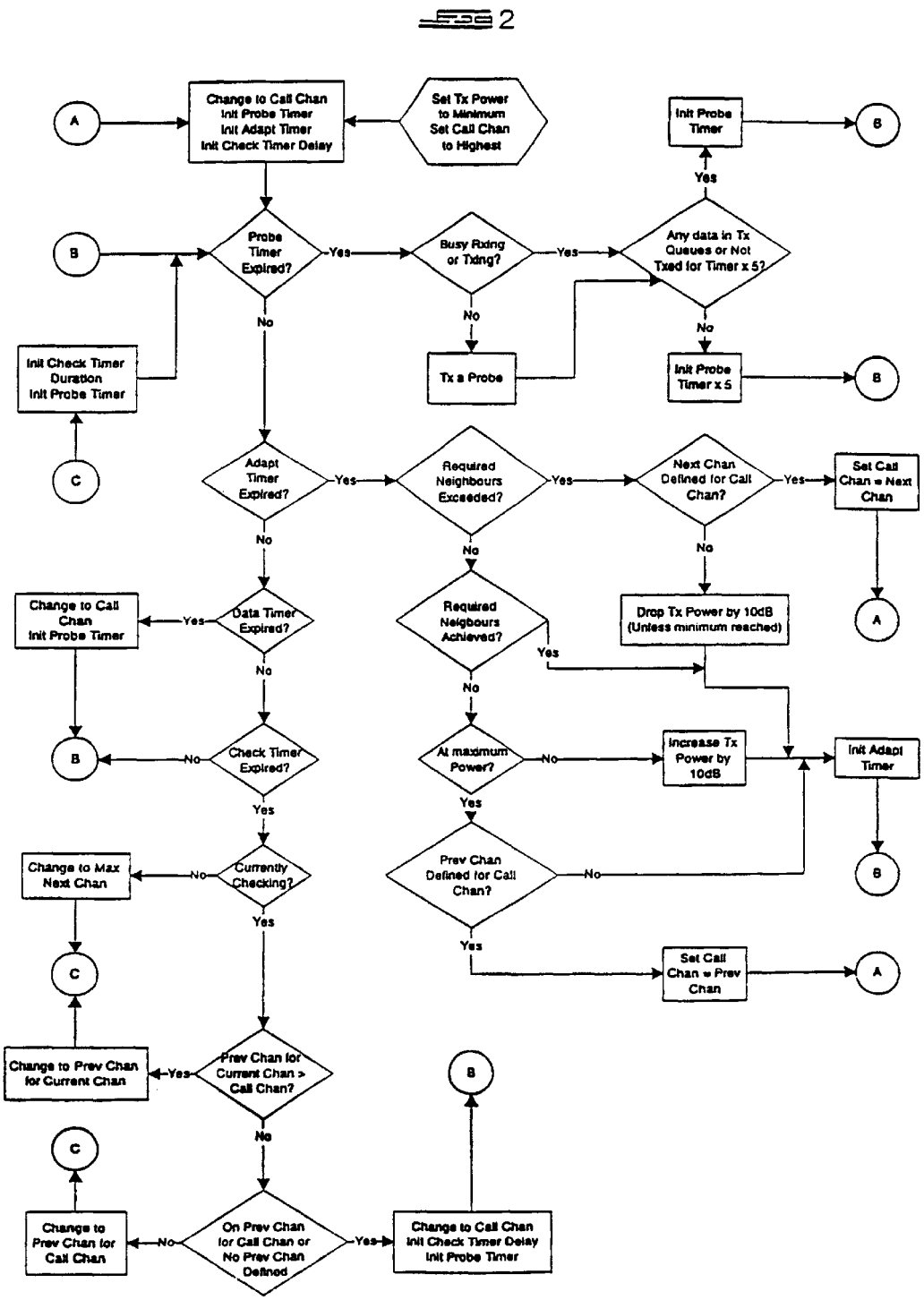
FIG. 2 is a flow chart illustrating the operation of the channel adaptation and probing method of the invention.

The flow chart of FIG. 2 shows how several different channel adaptation timers of the invention work in a given station. The flow diagram shows each of the timers being checked in sequence. However, they may be separate processes or events that are all checked simultaneously. The following sections will describe the different Channels and the associated Timers.

Probing—On Calling Channel

Each station will transmit probe signals at regular intervals (determined by a Probe Timer) trying to find other stations. Should any other station receive the probe it will randomly reply to the probe. The random reply would typically be 1 reply for every 1 to 4 probes received. In other words, other stations receiving the probe signals respond to a random number of the probe signals, the random number being equal to or less than the number of probe signals transmitted. This prevents contention with other stations in close proximity.

The time between probes set by the Probe Timer is used to respond to other stations for every 1 to 4 probes received. Since the time between probes is longer than the probe duration a replying station can respond with a small data packet that also contains data. However the maximum length of the response packet may not be longer than the normal Probe Timer interval.

Each station will randomly vary the Probe Timer slightly between probe signal transmissions to avoid collision with other stations. Should any station start receiving another station's transmission, it will reload the Probe Timer with a new interval.

When a station has data to send it transmits probes at an interval proportional to the data rate it is using (Probe Timer 1). However if a station has no data to send it will use an interval typically 5 times longer (Probe Timer 2) than that used when it has data. This allows stations that have data to send more opportunity to communicate. Because other stations will reset their Probe Timer every time a transmission is detected they may never probe if they have no data to send. Therefore every station will force out a probe after at least five times the normal interval.

A station that has data to send will be transmitting probes five times as often as a station with no data. The station with no data will rest its Probe Timer every time it hears the other station probe. Since the station with no data is using a longer interval it will never have a chance to transmit. Therefore the station with no data will reset its Probe Timer each time it hears the other station, unless the last time it transmitted was longer ago than the Probe Timer 2 interval, in which case it will reset its Probe Timer to the Probe Timer 1 interval. The station with data will also be using an interval corresponding to Probe Timer 1, therefore the station without data will get a chance to send a probe out. After sending out the probe it will revert back to using a time interval of Probe Timer 2.

The probe sent out by a station with no data to send is addressed to all stations (Broadcast Probe). Therefore any station may respond. However if a station has data to send it will alternate its Broadcast Probes with probes addressed to stations for which it has data (Addressed Probe). The Addressed Probes will sequentially go through all the IDs for which a station has data. Only the station addressed by the Addressed Probe may respond. Since no other station will respond, the addressed station will always respond immediately.

Calling Channel Adaptation

After first switch-on a station will start probing at the lowest transmit power and fastest data rate (Highest Calling Channel). This is to avoid interfering with other stations that may be in close proximity.

Each time a different station replies to the probe, the replying station is counted as a neighbour. If the required number of neighbours is not met within a predefined time interval (set by an Adapt Timer) the station will then increase its probe transmission power by 10 dB. It will continue to increase its probe transmit power until it achieves the required number of neighbours. If it reaches the maximum transmit power before reaching the required number of neighbours the station will then drop to the next data rate (Previous Calling Channel), but stay at the maximum transmit power. It will continue to drop its data rate until it achieves the required number of neighbours. If it never reaches the required number of neighbours it will remain at the lowest data rate and maximum transmit power.

Every time the station moves to a different Calling Channel it resets the Adapt Timer. It will also reset the Adapt Timer each time it changes its probe transmit power.

In a network of mobile stations the stations are constantly moving, and as such the number of neighbours will constantly be changing. If the number of neighbours exceeds the required number a station will start to increase its data rate (Next Calling Channel). It will continue to increase its data rate until it no longer exceeds the required number of neighbours. If it reaches the maximum data rate it will start to drop its probe transmit power by 10 dB until it either reaches the minimum transmit power, or no longer exceeds the required number of neighbours.

Every time a station changes its data rate it will move to a different Calling Channel. This is to avoid the lower data rates interfering with the higher data rates.

Data Channel

When a station responds to another station on a Calling Channel it will limit the length of its data packet to the Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Calling Channel. The station that is requesting the change will randomly select one of the available Data Channels. When the other station receives the request it will immediately change to that Data Channel where the two stations will continue to communicate until neither of them have any data to send, or if the maximum time for remaining on the Data Channel expires (set by a Data Timer).

When a station changes to the Data Channel it loads the Data Timer. It will remain on the Data Channel for as long as the Data Timer will allow. When the Data Timer expires the stations will revert back to the Calling Channel and start probing again.

Check Channel

For each Calling Channel there is a Previous and Next Calling Channel, except for the lowest data rate Calling Channel that only has a next Calling Channel, and the highest data rate Calling Channel that only has a previous Calling Channel. As the number of neighbours in an area increases, the stations will move to higher data rate Calling Channels. However stations that are further from the area will not have as many neighbours and therefore will remain on the lower data rate Calling Channels. In order for the stations to remain in contact, the stations must check the previous and next Calling Channels at regular intervals.

A Check Timer is set when a station arrives on a Calling Channel for the first time. The Check Timer period is proportional to the data rate of each Calling Channel (Check Timer 1). When the Check Timer expires the station first determines if it is currently checking or if it must still check. If it were checking it would drop to the previous Calling Channel from the one it was checking. However if it was not checking the station would jump to the Highest Calling Channel. This channel becomes the current Check Channel.

When a station arrives at a Check Channel it will reset the Check Timer. The Check Timer (Check Timer 2) period will be a much shorter interval than was used when arriving on a Calling Channel. After the Check Timer expires the station will then move down to the Previous Calling Channel. This then becomes the new Check Channel.

The station will continue in that manner until it reaches the original Calling Channel. At this point it drops one channel below the Calling Channel. If there is no previous Calling Channel it will terminate the checking and reset the Check Timer to the longer value (Check Timer 1). If there were a Calling Channel it would repeat the normal check operation. After this last check it will revert back to the original Calling Channel.

This means that a station will periodically check all Calling Channels above its current Calling Channel and one channel below its current Calling Channel. It will take a small amount of time to check the upper channels since they would typically be working at a rate 10 times faster than the current channel. However it will take time to check the Calling Channels below the current one, and it is for this reason that it only checks one level down.

Checking the Calling Channels not only keeps stations on different Calling Channels in contact, it also helps stations on lower Calling Channels to see more neighbours and therefore help them move up to the higher Calling Channels.

Timer Multiplication Factors

For each Calling Channel the data rate would typically be 10 times higher than the previous Calling Channel. From the data rate of the Calling Channel the duration of all the timers can be calculated using multiplication factors. The absolute values of the factors are given below, but it should be noted that these values are given as examples and may vary quite significantly. In addition, the correct values may be dynamically changed as the network traffic load and number of stations changes.

| Timer | Multiplication Factor | 8k rate example |
|---|---|---|
| Probe Timer 1: | 10 × duration of Probe Packet (Data in Tx Queue) | 300 msecs |
| Probe Timer 2: | 5 × Probe Timer 1 (No Data in Tx Queue) | 1500 msecs |
| Adapt Timer: | 100 × Probe Timer 1 | 30000 msecs |
| Data Timer: | 5 × Probe Timer 1 | 1500 msecs |
| Check Timer 1: | 30 × Probe Timer 1 (Not currently checking) | 9000 msecs |
| Check Timer 2: | 2 × Probe Timer 1 of current Check Channel | 60 msecs (80k check) |

Additional Points on Channel Use

The following constraints/options will typically be implemented in a network using the method of the invention:

A station may never communicate at a data rate less than the data rate of the Current Channel, however it may communicate at a higher data rate if the bandwidth allows.

A station will never respond to another station whose received S/N ratio falls below the required level. However if there is no Previous Channel to fall back to it will respond. For example, if it is on an 80 kbps channel, it will not respond to a station whose received S/N ratio is bad. This will force the other station to fall back to 8 kbps. However if it is already at 8 kbps, then there is no other channel to fall back to and it therefore will respond.

When switching channels a station must always wait for the duration of the Probe Timer before probing so that its probe signals do not collide with transmissions from other stations.

When responding to a station, the length of the packet will always be less than the Probe Timer delay, to prevent hidden terminals breaking response packets. When station A responds to a probe from station B on the calling channel, the length of the response packet, measured in time, will be less than the Prober Timer 1 interval. This is to prevent a third station C from transmitting over the response packet. This can happen when station A and station C can hear each other but station B and station C cannot hear each other. Station C would reset its probe interval when it detects station A sending out a probe. Since it cannot hear station B, it will not reset its probe interval when station B responds, therefore it would send out a probe after the Probe Timer expires. The probe from station C would corrupt the response packet from station B if it was longer than the Prober Timer. However, if the response packet is shorter it would reach station A without corruption before station C sends out a probe.

If a station has more data to send than can be sent within the Probe Timer interval, then the station will send what it can, and it will request that the other station change to a Data Channel. Therefore two stations should not communicate more than three "overs" (ie. consecutive replying transmissions) on the Calling Channel. Eg. station 1 Tx Probe→station 2 Tx Data→station 1 Tx Data (Either station 1 Tx Data, or station 2 Tx Data will request a Data Channel if they have more data to send).

The Probe Timer interval will not always be the same, it will have a random variation added to it (typically 50% of the Interval Timer duration). This will prevent a number of stations all transmitting at the same time each time, and thereby never receiving each other. For example, at 8 kbps the Probe Timer (With Data in Tx Queue) would typically vary between 300 and 450 milliseconds.

When a station has no data to send it will try to acquire five neighbours. However when it has data it may then choose to try to acquire more neighbours (typically 15). It should be noted that the station would be probing at a faster rate and therefore more likely to acquire more neighbours. If it does not acquire more neighbours it may then increase its transmit power. It should be noted that in networks with a heavy traffic load the number of neighbours required may not be increased as this would cause excessive contention.

Stations can keep track of other Stations moving to Data Channels. This will give an indication as to which data channels are available.

A second receiver can be used to scan Data Channels to find clear Data Channels with good background noise.

When a station probes it can provide information in the header of its probe signal data packet as to which Data Channels it monitors as clear. When another station responds and wishes to change to a Data Channel it can then combine its own information with that of the other station to make a better choice as to which Data Channel to use.

When a station is sending data it must not use a power level much higher than the power used for probing. For example, if a station is probing at 0 dBm to achieve the required number of neighbours then it must not respond with power at, say, 30 dBm as this would interfere with other stations further away. (The amount by which the power used for the transmission of data may exceed the probe power will be a parameter set for the entire network).

Noise and traffic can be monitored on multiple Calling and Data Channels simultaneously, using multiple receivers.

Probe and Data packets can be transmitted on multiple Calling and Data Channels simultaneously, using multiple transmitters.

The network may have more than one Calling Channel per data rate and many Data Channels per data rate.

Alternative Method 1

In a first alternative embodiment, the invention makes use of two types of probe signals. The first type of probe signal is a Broadcast Probe that contains a list of the best stations that a given station can detect. The number of stations in the list is typically in the order of 10. Associated with each station in the list is a number that indicates how well the probing station heard the ones in the list. Another number would indicate how well the stations in the list detected the probing station (this is gathered from the other stations' Broadcast Probes). Thus a third station will immediately know how well the probing station heard another station and how well the other station heard the probing station.

This arrangement eliminates the need to respond to probes, since when a station hears its own ID in a probe it knows that the probing station can hear it, and how well. When it then sends out its own probe, it will include the ID of the station that it has just heard. The other station will hear its own ID, thus closing the loop. Therefore by just sending out probes any station in close proximity with others will know which stations can hear it, and how well. It will also know by monitoring the other Probes which other stations the one probing can detect and how well. This information will then be used to set the number of neighbours.

Each Broadcast Probe from each station contains a list of all the stations it has detected. Since all the stations that can hear the probe will see themselves in the list, the station sending the probes does not need to do as often. In the method of probing described in the first embodiment above, a station needed to get a response from every other station in order to know they could hear it. Now all the neighbouring stations will know that the probing station can hear them since they appear in the list. When they in turn send out Broadcast Probe all the other stations will know they have been heard if they appear in the list.

The second type of probe signal of this embodiment is an Addressed Probe. When a station has data to send to or via a second station it will insert Addressed Probes between its Broadcast Probes at a much higher repetition rate. These Addressed Probes will force the addressed station to respond. Thus, when it has data to send the station will send a short Addressed Probe at faster intervals, thus increasing the opportunity to connect to the required station. The addressed station knows the probing station has data to send, otherwise it would not be addressing it. The addressed station may then chose to move to a Data Channel where the two stations will transfer data.

If a station does not see its own ID in the Probe List, and the list is not full, it should then randomly respond to the station sending the probe at the power level required to get back to the station in question. (This is to prevent a distant station never seeing any neighbours as they will all be probing at a lower power level.)

The Addressed Probe from any station will also include a list of the stations from which it received data, that it will send to the addressed station. For each station ID in the list there will be a number indicating how old the data in question is. Thus any other station listening to the probe will know that it has a route back to the source of the data (Origin) and will know how long it took the data to reach it. This information can then be used for routing.

If a station hears two different stations sending Addressed Probes with the same Origin ID, but different message delay times, then it can determine which is the shorter, and thus a better route. This will provide a gradient toward the Origin ID. When a station wishes to reach the Origin ID it will use this information to route the segments. If conditions change the station will dynamically re-route the segments in question.

A station will always know what power is required to get back to another station. Therefore it will know what power to use so that its probes will be heard by all its neighbours. For example, if a station is trying to achieve five neighbours it will probe at the power required to reach all five of the closest neighbours. In the first method of probing described above the station would simply increase its power in 10 dB steps until the required number of neighbours was met.

However, because it is using 10 dB steps, it may well exceed the required number of neighbours. It would then drop its power by 10 dB and then be below the required number. What will happen now is that the station knows that if it drops another 10 dB it will lose its required number of neighbours. Instead the station will work out what power it must probe at so that it will reach the required number neighbours, and will not go below this power even if the required number is exceeded. It should be noted that the required power will always be changing as the conditions change.

A station will try to keep a minimum number of direct and indirect neighbours. If for example it is trying to keep one direct neighbour and at least 5 indirect and direct it will work out the power required to reach the direct neighbour. If through this one neighbour it can reach another 4 neighbours then it has achieved its 5 direct and indirect neighbours. Otherwise it would use a higher power that may include 2 direct and 7 indirect, as long as it does not have less than the required number.

Part of the demodulation process at any station includes forward error correction. If the forward error corrector detects irrecoverable errors during the reception of a packet it can notify the main code that an error has occurred. The main code can then abort receiving the packet. This will prevent a station being tied up receiving a packet that is corrupt. It can also assist the station in receiving another packet from another station sooner. Sometimes in a network of the kind in question, one station will transmit at a higher level than another station, thereby corrupting the packet. It would be possible for the receiving station to detect the corrupted packet, abort reception and start receiving the stronger signal.

Alternative Method 2

In a second alternative embodiment of the invention, a method similar to the first alternative method is used. However, instead of using the time since a message segment was detected for routing, this method uses the combined or cumulative transmit power required for routing. The combined transmit power required is the power required by each intermediate station to reach the next one from the origin to the destination. Each intermediate station will also add a predetermined hop factor, which would typically be 3 dB. This hop factor is added to prevent reverse routing.

In this version of the method a station transmits broadcast probes at a regular interval. The broadcast probe contains a list of other stations that the current one has detected, or stations that have a flag set, such as Busy in Traffic. A station is deemed to be busy in traffic if it is either currently sending message data or receiving message data. For each station in the list the combined transmit power required to reach the station is also included and a number of flags indicating the type or status of station, e.g. Gateway, Certification Authority/Network Operator (see below), Busy in Traffic, etc. These flags are used to enhance routing.

The first part of the list contains the IDs of direct neighbours, i.e. stations that the current neighbour has detected with its own receiver. The transmit power required, which is included in the list, would be the power the current station would use to reach those stations directly. The second part of the list includes any station that has a flag set, i.e. Gateway station, Busy in Traffic, etc. The transmit power required, included in this part of the list, would be the minimum combined power required to reach these stations via the current station. It is possible that the combined or total transmit power required to reach one of its direct neighbours via an intermediate station would be less than the direct transmit power required. This would typically happen when there is a direct route and an alternate route to the same destination station, where the alternate route uses less combined (cumulative) power.

With reference to FIG. 1, if station I detects both stations M and L, it would have a (direct) required transmit power for both stations. However, when station I detects station M's probe it would see a listing for station L. Station I would then have a direct power required for station L as well as a combined power required for station L (via station M). It is possible that the combined or cumulative transmit power requirement to station L via station M would be less than the direct transmit power requirement to station L.

Each time a station detects another station's probe it calculates the power it would need to get back to that station directly. It stores this direct transmit power requirement for each station it has detected. It also looks at the list included in the other station's probe. From this list it can see what power would be required by the remote station to reach any of the stations included in the list. The local station adds the linear power requirement for the remote station to reach any station in the list to the power required for the local station to reach the remote station. It then adds an additional hop factor to this number. This new total would be the combined power that the current station would advertise in its own probes to other stations.

The local station first converts the direct power it requires to reach the remote station from dBm to watts. It then converts the power required by the remote station to reach the station in its list from dBm to watts. The local station then adds these two numbers to get a new value in watts. This new value is then converted back to dBm. At this point the hop factor is added. A typical value for the hop factor would be 3 dB. This new total would then be the combined power required by the local station to reach the station "advertised" in the remote station's list.

From the data rate of the Calling Channel the duration of all the timers can be calculated using multiplication factors. The absolute values of the factors are given below, but it should be noted that these values are given as examples and may vary quite significantly. In addition, the correct values may be dynamically changed as the network traffic load and number of stations changes.

| Timer | Multiplication Factors | Values | 80k rate example |
|---|---|---|---|
| Probe Timer Tx Queue Full = | PrbF × MaxTxDur = | 1 × X = | 247 msecs |
| Probe Timer Tx Queue Empty = | PrbE × PrbF × MaxTxDur = | 10 × 1 × X = | 2471 msecs |
| Channel Adaptation Interval = | Adpt × MaxTxDur = | 5 × X = | 1235 msecs |
| Tx Power Required Increment = | TxInc × MaxTxDur = | 5 × X = | 1235 msecs |
| Data Channel Duration = | Data × MaxTxDur = | 5 × X = | 1235 msecs |

Where MaxTxDur = Max Packet Size Duration + RxTx Turnaround + Tx Delay = X = 247.1 msecs The maximum packet size is set to 1023 bytes. The length of all the timers will increase if the maximum packet size is increased. The effect of increasing the maximum packet size would be to reduce the number of probes over a given time period, and therefore slow down the connectivity of neighbouring station, which in turn increases the propagation delay of data across the network. On the other hand if the maximum packet size is decreased this would reduce the amount of data that can be sent in between probes on the calling channel. This is turn would also increase the propagation delay of data across the network. By weighing the amount of data that can be sent on the calling channel, against the number of probes over a given time period, the correct maximum packet size can be determined.

If a station has more data to send than will fit in the maximum packet size, it will request that the other station move over to a data channel. The two stations will then be able to send more data to each other so long as they remain on the data channel. The can remain there for as long as they have data to send or for the "data channel duration", whichever comes first. If a station moves to a data channel and does not find the other station there it will return to the calling channel.

The stations in such a network would typically be moving, and as such they may move further away, or even out of range. The local station would therefore need a way to increase the power required to reach a destination station, and ultimately remove from its list a destination station that is no longer in its vicinity. The path loss between two stations can change rapidly, especially due to Rayleigh fading. Each time a station transmits to another station it must do so at an optimum power. It can determine the power required each time it hears the other station transmit. Typically when two stations are busy sending data to each other they would have many transmission "overs" per second. Each time, they re-calculate the power required to reach the other station. Their power changes would typically follow the changes in a Rayleigh fading cycle.

This works well to optimise the power required for each transmission, however it can cause routing problems, since with each fade it is possible that an alternate route may momentarily look better. A station must therefore keep two direct transmit power required values. The one value is used for each transmission to set the required power for the transmission, and the second value is used for routing. This second value would not follow the fast path loss changes associated with Rayleigh fading, but would rather have a more damped effect to follow the changes associated with stations moving in and out of range. It is envisaged that it will normally be the second value that is advertised in the station list in the probe signal.

This damped power requirement is achieved by slowing the rate of increase of the power required to reach any station in its list. All stations in the network will increase the required power at the same rate. The rate of increase is directly coupled to the data rate of the transmissions on the calling channel. Each time a new probe is detected the local station will determine if the new calculated required power is less than the required power it has in its own list. If it is less it will then reduce the required power in its own list. It will not reduce the power in one step, but rather reduce it in smaller steps each time it detects a station, thus damping the effects of Rayleigh fading. (See below.)

If a station no longer detects probes from a particular station it will keep increasing the power required to reach the station. Eventually the required power will reach a pre-set maximum value that requires the local station to remove the other station from its list. This value is typically 125 dBm.

At this point a station now has a list of required transmit powers to reach other stations either directly or indirectly. For each station listed in a remote station's list there will be an entry indicating a combined required transmit power via that remote station. With reference to FIG. 1, station I would have listings of direct transmit power required for stations L, M, N, and B. It would have indirect listings for any stations detected by these four latter stations, i.e. stations A, G, H, J, L, M, N, and O. Stations L, M, and N appear in both the direct and indirect listings, since they are common neighbours. If station I wanted to route data to station M it could chose to transmit either directly to station M, or via stations L or N. Station I would determine which route's power requirement would be the lowest, and use that path for routing of message segments to station M.

At this point station I does not have a direct route to station O, and unless it wants to communicate with station O it does not require such a route. However if station O should be busy in traffic with station A, then segments from and to station O would be passing via station I, in which case station I would detect these passing segments. Each segment header indicates the combined transmit power required back to the origin of the segment. When station M first receives a segment from station O it will place its direct power requirement into the header of the segment before passing it on to station I.

When station I receives the segment from station M it will add the power required to reach station M into the segment from station O, it will also add the hop factor to this value. The segment will now contain the combined required power from station I to station O via station M. This procedure is repeated at each hop until the segment reaches station A.

From the required powers for each station, any station in the network will now have a required power gradient in the direction of any other station in the network. A station simply routes message segments in the direction of least required power.

When origin station A first wanted to communicate with the destination station O there was no gradient, since neither station was busy in traffic. In order to create the gradient, the origin station A sends out a special Chaser message for the destination station O. This message is routed away from origin station A by moving it up the required power gradient. At each station the message is split in two and routed in two different directions. This message will therefore flood the network in a direction away from station A.

Once the Chaser message reaches a station that has a gradient towards the destination station O it will be routed towards the destination. Once it reaches the destination station O, station O will send back an ETE (end-to-end acknowledgement) message to station A. This message will automatically have a gradient back to the origin station A since the Chaser message created the gradient. The ETE has a higher priority than the Chaser message and it will therefore move through the network faster. When any station receives the ETE it will route the ETE back to the origin, and also route it along the path the Chaser messages were sent. This is used to stop the flooding of the Chaser message. It should be noted that the chaser message is very small, and has a short time-to-live. Therefore even if the Chaser message floods across the entire network has a minimal effect on the throughput of the network.

When station A first sends out the Chaser message it also flags itself as Busy in Traffic. It will keep this flag set for the duration of the Chaser message. Any other station detecting station As probes will see the flag is set, and include station A in their list for their own probes. Any other station that detects another station with station A in its list with the Busy in Traffic flag set, will in turn also advertise station A with the Busy in Traffic flag set. Each time station A sends out a new message, it will reset its in traffic timer to be the same as the time-to-live of the message it is sending. If station A stops sending messages the in traffic flag will eventually time out, and no longer be set.

A station only places another station in its probe list each time it updates the required power as being better than it was, ie. if a station detects a neighbour, or detects a station in another station's list, it will determine whether the required transmit power to the station in question is better than the existing value in its internal list. If it is better, it will change the required power in its internal list, and also include the station in its next probe list. This helps to keep the probe list small.

If station A no longer has its Busy in Traffic flag set, it will no longer be included in the lists of other stations. The other stations will slowly increase the transmit power required to reach station A, and since it is no longer in traffic, they will no longer receive updated values. Eventually the required transmit power for other stations to reach station A will reach the pre-set value that requires them to remove station A from their lists.

Besides the Busy in traffic flag there may be a number of other flags, typically to identify important stations in the network with which any other station might need to communicate from time to time. The Gateway flag is used to indicate an important station that is used as a gateway to another service, e.g. for access to the Internet. If a station has a gateway to the Internet it would have a flag set indicating that it is an Internet gateway. Each time a neighbour station detects a better required power to the gateway station it will include it in its list, with the Gateway flag set. Any other station that now detects the gateway station in the list of this neighbour station will in turn include the gateway station in its own list. This gateway station listing will propagate through the network. Eventually all stations will have the gateway station in their lists. Therefore any stations that need access to the Internet will know where they must route their Internet data.

There may be more than one Internet gateway in a network. A station only requires one gateway. Therefore a station will only place one Internet gateway station in its list. It will always choose the one that has the least required transmit power. The effect of this will be that stations will always have a better power gradient to the gateway closest to them, and they will typically only list their closest gateway. Should their closest gateway become unavailable they will automatically discard that gateway since the power requirement will increase to the point where other gateways will look better.

In the same way as the Gateway flag is used, so may other flags be used, such as Certification Authority. The Certification Authorities (or Network Operators) are stations in the network that maintain and issue certificates of authority used for security in the network. All stations in the network use private and public key sets to verify and encrypt data received from and sent to other stations. As with the Internet gateway, any station only needs to know the route to one Certification Authority.

The Certification Authorities correspond to the Network Operators referred to in PCT patent application no. PCT/GB98/00392 of the applicant, the contents of which are incorporated herein by reference.

When the Destination station receives a message from the Origin station it starts a timer (Gradient Timer) that expires halfway through the original Time-To-Live of the message. The Time-To-Live is the amount of time for which a message is valid. This new Gradient Timer will therefore become due before the message received expires. If a new message is received from the same Origin station the Gradient Timer will be reset to a new value. This means that so long as messages are arriving from a specific Origin station the Gradient Timer will never expire.

When messages stop arriving from a specific Origin station the Gradient Timer will expire. When the timer expires a Gradient Message will be sent to the Origin station. Since the message will include the combined transmit power required back to the station that sends the Gradient Message, a transmit power required gradient will be refreshed from the Destination station (the one to which messages were originally travelling) back to the Origin station.

The purpose of the Gradient Message is to make sure that a fresh gradient is formed when data messages stop arriving from the Origin station. The messages may have stopped arriving either because there are no more messages, or because the gradient has become invalid. This can be caused by a number of mobile stations moving at the same time, or turning on or off at the same time. Typically the network would not require a Gradient Message since the gradient dynamically corrects itself between two stations that are in traffic. It is added as a failsafe mechanism.

A flag can also be added to the last message sent from a station in order to prevent a Gradient Message from being sent, ie. the Origin station informs the Destination station that no more messages will follow. The Destination station will then know that a Gradient Message is not required.

It should be noted that the stations do not send routing information with the messages they send. They also do not transmit routing information between themselves. However they do send transmit power required information, and information about which stations are in traffic, or are gateways etc. It is the responsibility of each station in the network to make its own routing decision dynamically about each message or message fragment in its Transmit Queue.

A station may at any time dynamically re-route a message fragment from one Transmit Queue to another. A station maintains a separate Transmit Queue for each of its neighbours. The routing at each station is un-correlated to the routing at any other station. A station's routing is based purely on the transmit power required information and the routing status flags. Since the transmit power required, and the status flags may change at any time, so may the routing of a message. A station will route a message opportunistically based on the current information it has on hand. Therefore if a new routing opportunity arises which looks better than the current route for a specific message, the station will dynamically re-route the message.

The changing transmit power required will result in a changing routing gradient for each station in the network. At any given moment in time the transmit power required gradient to a specific station would indicate the best route for a message. A station will always route a message in the downward direction of the gradient for the Destination station, except for Chaser messages, which would be routed up the Origin station gradient and simultaneously down the Destination station gradient.

As described above, every time a station detects one of its neighbouring stations it calculates the transmit power required to reach that station. The local station will reduce the transmit power required value it previously had stored for the neighbour station if the new transmit power required is less than the previous value. However it will not reduce it to the new value in one large step, but rather in small steps each time it hears the neighbour station.

Therefore the more "often" the local station hears the neighbour station the lower the transmit power required value will be. If it does not hear the other station for a while, the transmit power required value will start to increment at a regular interval, until eventually it reaches a level where the local station will remove the neighbour station from its internal list.

If a neighbour station is relaying a lot of data on behalf of other stations it will spend a lot of time on the data channel and not much time on the calling channels. As a result its neighbouring stations will not hear it very often, and as such the transmit power required to reach this station will be high. This will cause the neighbouring stations to opportunistically choose alternative routes for data. Since the data is now going via alternative routes the station that was sending a lot of data will have less data to send. This method therefore dynamically sheds or distributes the traffic load amongst neighbouring stations based on how often the stations are heard. The transmit power required gradient will always move away from areas of high traffic congestion, and towards areas of low congestion. The transmit power required gradient automatically equalises the routing and congestion of traffic flow.

If a neighouring station hears another station often and for a "long" period of time it will have a good transmit power required gradient towards the station. However if the station hears the other station often but only for short periods of time, it will have an average transmit power required gradient. The longer the periods of time the better the gradient. Therefore a station will tend to have a better gradient towards stations that it hears often and long.

Even though a station may hear another station often and for long periods of time, the other station may be far away, in which case the transmissions received are not "strong". The transmit power required is calculated from the path loss to the other station. The weaker the received signal the larger the path loss, and thus the more transmit power required. The larger the transmit power required the larger the transmit power required gradient. Since a station routes towards areas of lower transmit power required it will tend to route to other stations that are closer.

The more strongly a station hears another station the better the transmit power required gradient. Since the gradient is based on transmit power required, which takes into account the background noise of the remote station, it will also be better towards stations that have a low background noise. Stations that have high local interference will have a high background noise. A station will have a better transmit power required gradient towards stations which it hears strongly and which. have a low background noise. The routing of data will therefore avoid areas of high background noise.

The routing method described in this document will handle both fast and slow Rayleigh fading. In the case of slow Rayleigh fading a station will hear another station often, long, and strongly when there is a low path loss between the two stations. This will result in a good route via the station during the period of low path loss. If the fade starts to get worse, the path loss will get worse, and the route will start to look worse, since the transmit power required gradient will get steeper. The transmit power required will be larger than the previously stored value, and the value will not be updated. However, since the transmit power required is incremented at a regular interval it will automatically get worse (slowly). Therefore the routing will dynamically follow the slow Rayleigh fades.

In the case of a fast Rayleigh fade a station will detect the other station often, but in short bursts. This will result in an average transmit power required gradient. The gradient is damped by the slow increment, and the fact that the transmit power required is only decreased in small steps. This means that a station will not follow the fast Rayleigh fade, but it will include the effect as an average. Therefore if there are three stations at a distant location, one moving, one in a Rayleigh trough, and the other in a Rayleigh peak, the station in the trough will have a bad transmit power required gradient, the one in the peak will have a good transmit power required gradient, and the moving one will have an average gradient. These equate to the opportunistic availability, of the three stations, ie. the one in the trough provides a bad route, and will require a lot of power to reach. The one in the peak offers a good route, and requires little power to reach. The one moving will require a little power some of the time, and-more power at other times, and as such provides an average route.

The transmit power required gradient used for routing takes into account the average power the station will use during the fast Rayleigh fades. It should be noted that even though the routing averages the effect of fast Rayleigh fade, the station will still dynamically change its transmit power when it actually transmits the data packet. Therefore the actual transmit power used when the station transmits a data packet will fit the fast Rayleigh curve. A station keeps a separate transmit power required used for actual on air transmissions, which is not damped in the same way as the transmit power required used for routing.

The transmit power required gradient is constantly optimised and improved so long as data messages are flowing. Data messages from the Origin station maintain a fresh gradient back to the Origin station from any station along the route where the data messages flow. The ETE (end-to-end acknowledgement) messages returning from the Destination station maintain a fresh gradient back to the Destination station. Any station on the route will be advertising that both the Destination and Origin stations are busy in traffic. In turn any neighbour of any station on the route will also be advertising that those two stations are in traffic, etc. Therefore there is a constantly optimising gradient directly along the route, and also along the sides of the route. Each time a new message flows along the gradient the gradient is re-optimised. Should any station directly along the route become inactive, move away, or become loaded with traffic, the gradient will automatically optimise around this station.

In the case of a very popular destination for data messages, such as a GPS-based vehicle tracking centre, a lot of messages will be flowing to the Destination station, and in turn a lot of ETE messages will be flowing away from the Destination station. These ETE messages will be flowing out in all directions to all the different vehicles that are sending GPS position updates to the tracking centre. This means that this particular central station will have a very optimised and wide spread gradient across the network. Should a new vehicle turn its tracking device on for the first time, or after a long time off, it will immediately have a route to the central station, negating the requirement to send a Chaser message. Since it is known that this central station will always have optimised routes there is also no need for it to send out Gradient messages.

Software Updates

Figure 3:
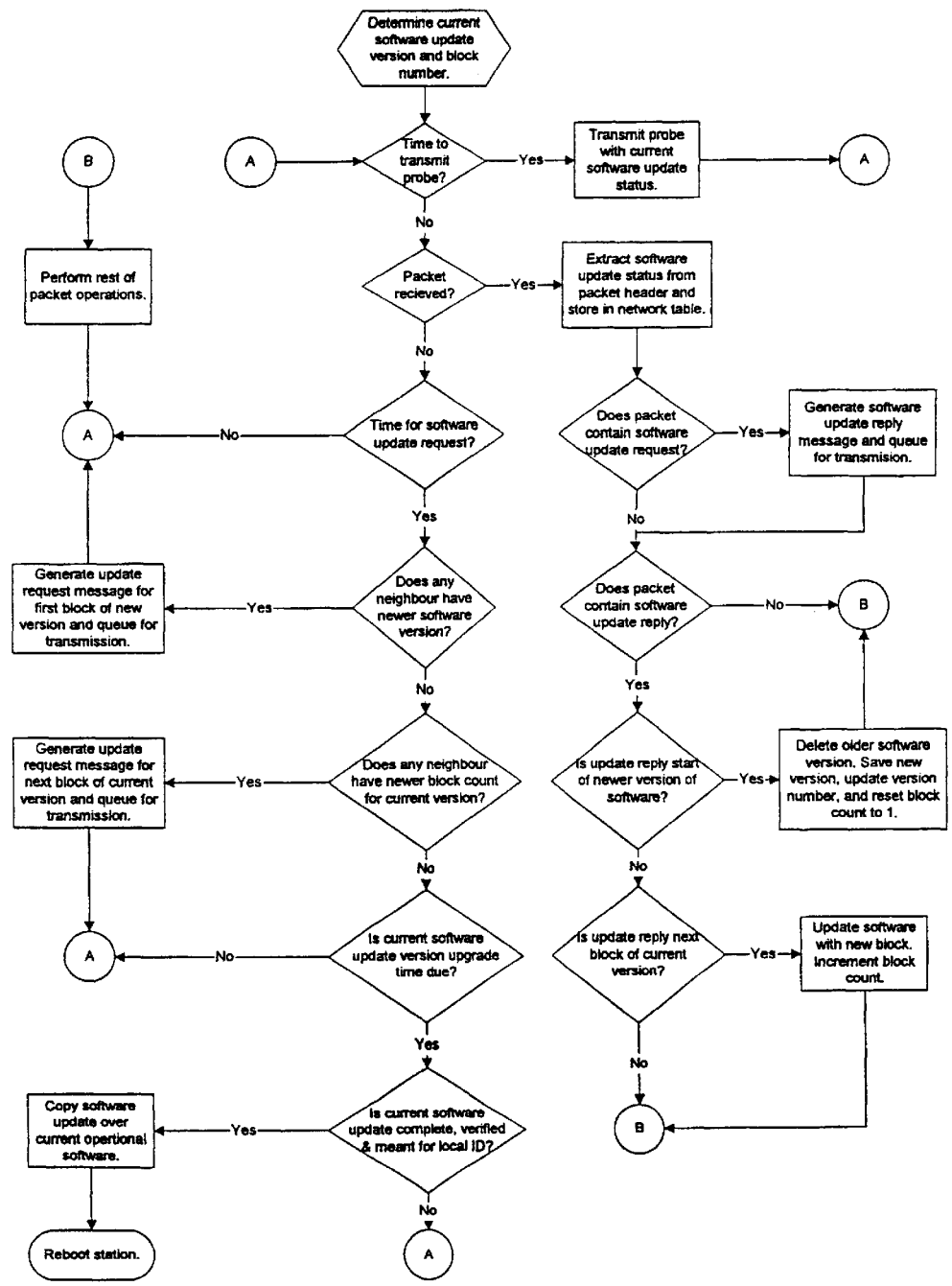
FIG. 3 is a flow chart illustrating a software updating mechanism of the invention.
Figure 4:
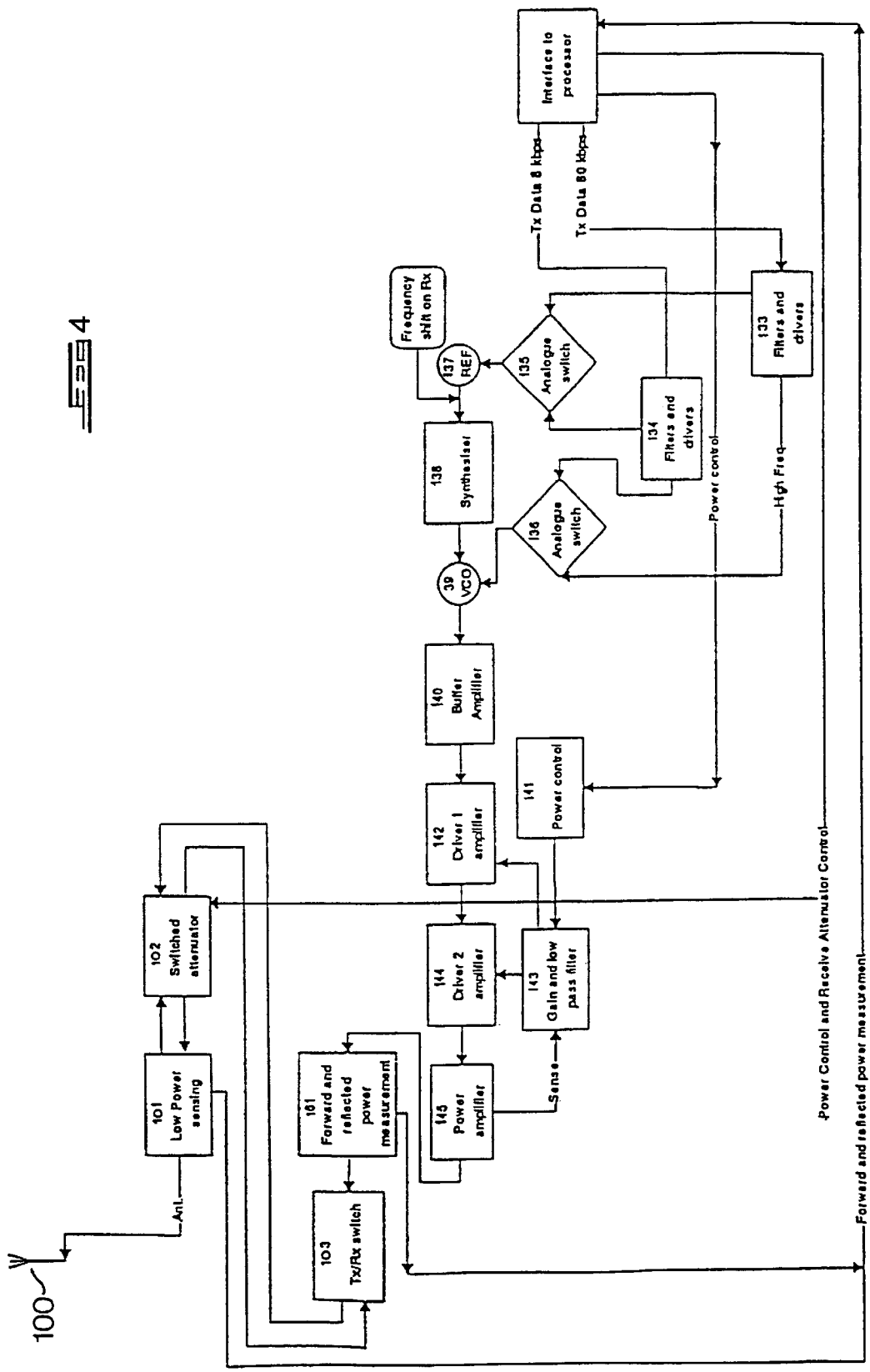
Figure 5:
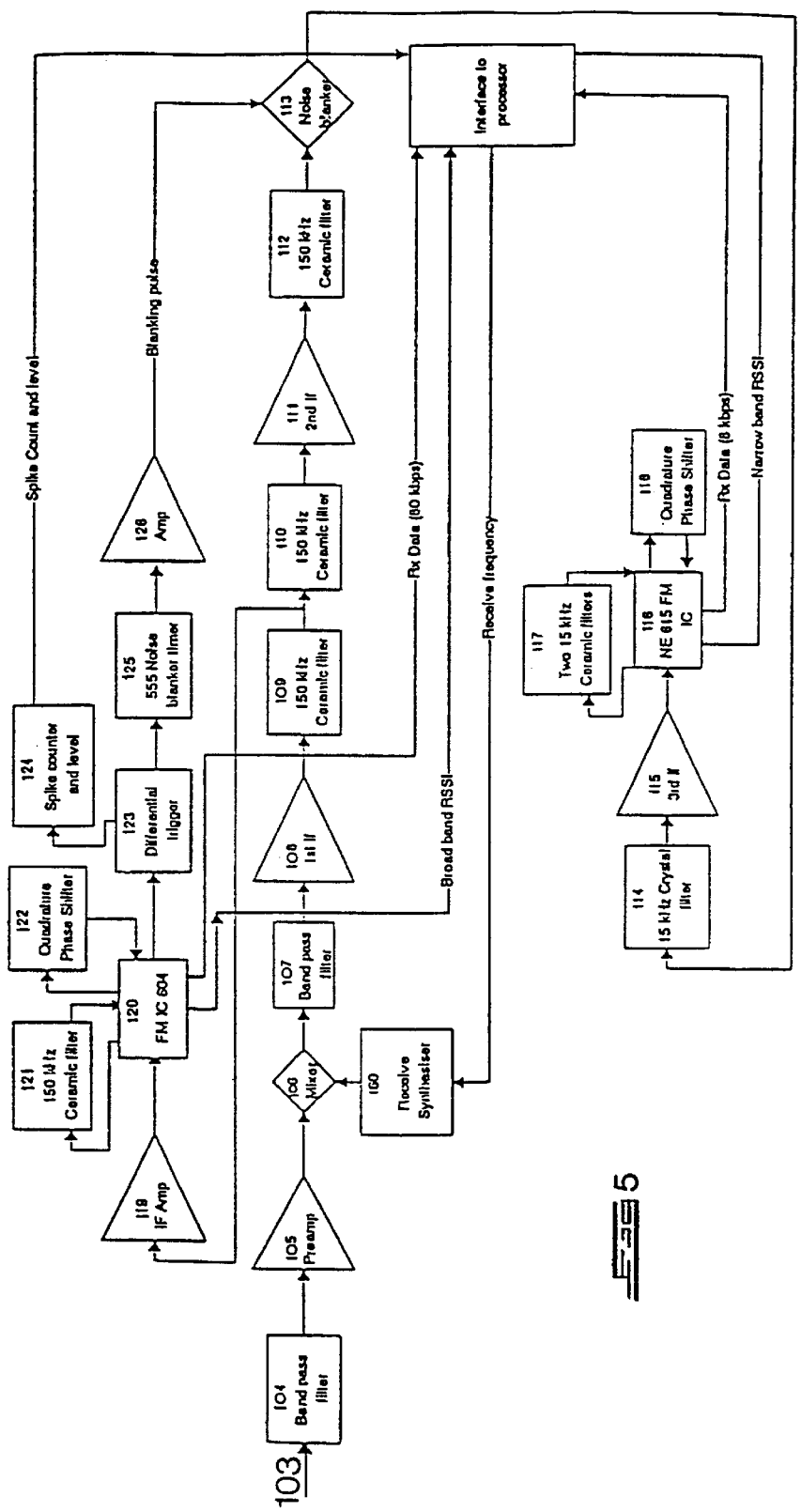

In order to facilitate the updating of software in the network, a mechanism is provided that makes use of the direct neighbour's information. When a new software update is made available, it is loaded on to the hard drive of any station in the network. This software update is then sent in block s from this station to its direct neighbours. The direct neighbours in turn will send it to their neighbours, until the entire network has the update. A flow diagram of the software update protocol is shown in FIG. 3.

When the first station has the update on its hard drive a command is issued, by the user, to tell the station to start advertising the new update in its probes. When a direct neighbour detects the probe it will notice the new update. The neighbour will then request a software update message from the first station. This station will send the first update block. When the direct neighbour receives the update block it will wait a while before requesting the next block. The reason it waits is to prevent clogging of the whole network with software update messages.

The neighbour station will keep requesting update blocks from the first station until it has all the blocks. Each time it receives a new block it will start advertising in its own probes which version and block number it has. The neighbour can then start sending updates to other neighbours even before it has the entire update. This starts a bucket brigade effect for the software update. It is possible that one of its other neighbours gets the update faster than it does. If this other neighbour is closer to it (in transmit power terms) than the first station, the neighbour may even start requesting the updates from the closer neighbour instead.

The first part of the software update contains information as to when the update must be performed. This is the date and time when the station must take the update and replace its existing software. Until that time arrives the station will simply hold onto the update. After it has updated the running version of its software it will keep the update until a newer version arrives. This will allow it to send the update to any station that may have been off during the software update period.

It is also possible to include which Ids should administer the update, this will allow partial network updating in order to test a new software version. The update would still be sent to every station in the network, but only some of the stations will perform the update. If the update works as planed a special update block is added to the end of the software update. The station will detect that there is a new block to add. When they receive the new block they will check the block for new update Ids. This allows the other station to be updated without sending out a whole new software update.

Set out below is a table defining the structure of Probe and Data packets used in the method and system of the present invention, together with an explanatory glossary.

Format of Probe and Data packets

| Variable | Bit Len | Allows |
|---|---|---|
| Preamble | 64 | Modem training sequence (101010101010 etc . . .) |
| Sync1 | 8 | First Sync Character used to lock Zilog |
| Sync2 | 8 | Second Sync Character used to lock Zilog |
| Sync3 | 8 | Third Sync character checked by software |
| Packet Size | 16 | Size of packet from Sync3 until last CRC |
| Size Check | 8 | Packet Size Check = Packet Size MSB XOR LSB |
| Protocol Version | 8 | Protocol Version |
| Packet Type | 8 | Packet Type (E.g. Probe, Data, Key, etc.) |
| Sending ID | 32 | Sending Station ID |
| Receiving ID | 32 | Receiving Station ID (0 = Broadcast) |
| Packet Number | 16 | Packet number |
| Adp Tx Power | 8 | Sending station current power in dBm |
| Adp Tx Path Loss | 8 | Path Loss measured at sending station in dB |
| Adp Tx Activity | 4 | Sending station current Activity Level |
| Adp Tx Antenna | 8 | Sending station current antenna configuration |
| Adp Tx Bkg RSSI −1 | 8 | Sending station RSSI in dBm -> Current Modem −1 |
| Adp Tx Bkg RSSI | 8 | Sending station RSSI in dBm -> Current Modem |
| Adp Tx Bkg RSSI +1 | 8 | Sending station RSSI in dBm -> Current Modem +1 |
| Adp Tx Spike Noise | 8 | Spike Frequency & Level at sending station |
| Adp Rx Activity | 4 | Required Activity Level for receiving station |
| Adp Rx Channel | 8 | Required Rx & Tx Channel for receiving station |
| Header CRC | 16 | 16 bit CRC for header data |
| Neigh Routing Flags | 8 | Bit 0 - In Traffic, Bit 1 - Gateway, Bit 2 - Cert Auth |
| Neighbour Data Size | 16 | Size of routing data in bytes = 3 + 4 (Update) + IDs * 6 |
| Neigh Soft Update | 32 | Software Update Version (16) and Block Number (16) |
| Neighbour Data | x | Neigh * (32 (ID) + 8 (TxPowerReq) + 4 (ModemReq) + 4 (Flags)) |
| Packet Data | x | |
| CRC | 32 | 32 bit CRC for whole packet, including header |

A station will always request the updates from the closest neighbour. This means that if a station is mobile it will be requesting updates from different stations each time. The size of the software update blocks is made small so that if a station is mobile it will not have a long message lagging behind it in the network.

If a station moves into an area where its neighbours do not have the complete update, or any update, it will wait until the software update catches up with it along the network. If the station moves back into an area where the update is further advanced than what it has, it will continue where it left off.

Preamble:
    This is a modem training sequence consisting of alternating 1's and 0's.
Sync–Sync3:
    These are the three Sync characters that are used to detect the start of a valid packet.
Packet Size:
    This is the total size of the packet from Sync3 up to and including the last CRC byte. The maximum packet size that is allowed on a probing channel is determined by the probing rate, ie. a station may not send a packet that is longer (measured in time) than the spacing between probes on the probing channel. The maximum packet size that is allowed on a data channel is determined by the amount of time a station is allowed to remain on a data channel.

Size Check:

This is used to check the Packet Size variable to avoid any invalid long packet receptions.

Protocol Version:

This is used to check which protocol version is being used. If the software can not support the version the packet will be ignored.

Packet Type:

This defines the type of packet being sent. Another packet will directly follow the current packet, if the most significant bit is set.

Receiving ID:

This is the ID of the station to which the packet is addressed.

Sending ID:

This is the ID of the station currently sending the packet.

Packet Number:

Each packet that is transmitted is given a new sequential number. The number is not used in any way by the protocol. It is merely there to provide information to a systems engineer. Each time the station is reset, the packet number starts at a random number. This prevents confusion with older packets.

Adp Tx Power:

The sending station's current power is given as the absolute power in dBm, in the range −80 dBm to +70 dBm. (Field allows values from −128 dBm to +127 dBm)

Tx Path Loss:

This is the path loss as measured at the sending station. Path Loss=(Remote Tx Power−Local RSSI) of receiving station's previous transmission. A value of 0 is used to indicate that the sending station's RSSI was pegged. The Path Loss is used as a correction factor at the receiving station, for the next time the receiving station transmits to the sending station.

Adp Tx Activity:

This is the activity level of the sending station, measured as: Activity=Watts*Time/(Bandwidth*Success) averaged over time.

Adp Tx Antenna:

This indicates the current antenna configuration being used by the sending station. Each of the 255 possible configurations describes a complete antenna system, i.e. Tx and Rx antenna.

Adp Tx Bkg RSSI:

This is the current background RSSI at the sending station for the modem that it is currently transmitting on. It allows for values from 255 to −1 dBm. The value sent is the absolute value of the RSSI, and the receiving station must multiply the value with −1 to get the correct value in dBm. A value of 0 is used to indicate that the channel is not available or is greater than or equal to 0 dBm. A value of 0 dBm cannot be used for adaptation purposes.

Adp Tx Bkg RSSI−1:

Same as above except for the previous modem.

Adp Tx Bkg RSSI+1: Same as above except for the next modem.

Tx Spike Noise:

The lower 3 bits for spike frequency in Hz, 0=none, 1,5,10,50,100,500, &>500, and the next 5 bits for spike amplitude in dB.

Adp Rx Activity:

If a station has a high activity level and is interfering with other stations, they will use this field to force the active station to drop its activity level. If a number of stations request a drop in activity then the interfering station will respond and drop its activity. If no stations request that such a drop, the active station will slowly start to increase its activity level. Thus if a station is in a very remote area it will keep increasing it activity level trying to generate connectivity. If it is in a very busy area, other stations will keep its activity at a lower level.

In preferred embodiments of the invention, a station will always try to maintain five neighbours, so that other stations should not need to request that the station reduce its activity. However the feature has been provided for cases where stations cannot reduce their power, or increase their data rate any further, yet they still interfere with too many other stations.

Adp Rx Channel:

Allows 255 predefined channels. These channels are set for the entire network. Each channel will have a probing rate associated with it (it may be turned off, which makes it a data channel). Each channel will also have a minimum data rate associated with it. The channels will have the Tx and Tx Frequencies defined. The channels may also be defined as other media, e.g. Satellite, Diginet, ISDN, etc.

A sending station will request that another station move to a data channel (ie. where probing has been disabled) when it has more data to send to the receiving station than can fit in the packet size allowed for the probing channel.

Header CRC:

This is a 16-bit CRC check for the header data. It is the sum of all the bytes in the header. It is only checked if the packet CRC fails. This is provided as a means of determining which station sent the packet. If the packet CRC fails and the header CRC passes, the data provided in the header should be used with caution, since the Header CRC is not a very strong means of error detection.

The Neighbour routing fields given below are not included in the Header CRC since they may not be used unless the packet CRC is passed. This makes the routing less prone to errors.

Neigh Routing Flags:

These flags are used to enhance routing. They provide additional information about the current station. Currently defined bits are:

Bit 0—Set if current station is busy in traffic.

Bit 1—Set if current station is an Internet Gateway.

Bit 2—Set if current station is Certification Authority.

Bit 3—Reserved.

Another byte of 8 bits could be added should more flags be required.

Neighbour Data Size:

Size of routing data in bytes. This includes the Neigh Routing Flags and Neighbour Data Size (ie. 3 bytes). Another 4 bytes are added if the Neigh Soft Update field is included. An additional 6 bytes are added for each neighbour included in the Neighbour Data section. Neigh Soft Update must be included if any Neighbour Data is included.

Neigh Soft Update:

This is the current version of update software available at the current station (Upper 16 bits of field) and the current block number available (Lower 16 bits of field).

Neighbour Data:

This is the list of neighbours that the current station has routing data for. Every time the current station receives updated routing data for a station that is better than the data it had, it will update its own data and include the station in this list in its next probe. The data section has four sub fields for each station in the list:

Station ID: 32 bit field with the ID of the neighbour station.

Tx Power Req: 8 bit field indicating the combined or direct Tx power required to reach the Station ID from the current station.

Modem Req: Modem required by current station to reach destination station.

Flags: Flags giving additional routing information for destination station. Bit 0—In Traffic, Bit 1—Gateway, Bit 3—Cert Auth, Bit 4—Direct Neighbour. The last bit indicates that the station in the list is a direct neighbour of the current station.

Packet Data:

This is the data of the packet. It is made up of 1 or more segments. The segments may be of any type, and may have originated or be destined for any ID.

CRC:

This is a 32 bit CRC check for the entire packet. If this CRC fails the packet data is discarded, however the header data may still be salvaged if the header CRC passes.

Segment Type:

This indicates the type of segment being sent. Types include:

Seg Msg: Segment contains message data. Sent from Origin ID to Destination ID and relayed from any intermediate station to any other intermediate station.

Seg Ack: Used to acknowledge Seg Msg. Sent from any intermediate station that has just received Seg Msg from any other intermediate station.

Seg ETE: Sent from Dest ID to Origin ID when Dest ID receives Seg Msg. Also relayed from any intermediate station to any other intermediate station.

Seg ETE-Ack : Used to acknowledge Seg ETE. Sent from any intermediate station that has just received Seg ETE from any other intermediate station.

Segment Type Acked:

Used to indicate the type of segment being acknowledged by the current segment.

Destination ID:

Destination ID for the current Segment.

Origin ID:

Origin ID for the current Segment.

Message Number:

Number of Message being sent/acked.

Message Submission Number:

Message may be re-submitted after specified interval by Origin ID if no ETE received from Destination ID. This field indicates the current submission number.

Message Size:

Indicates total number of bytes in message.

Fragment Start:

Indicates which fragment starting number is being sent. Message is broken up into fragments of 16 bytes each.

Fragment End:

Indicates which fragment ending number is being sent.

Fragment Priority:

Indicates priority of fragment.

Fragment Time-To-Die:

Indicates relative time-to-die of fragment. This is the number of milliseconds left until the fragment is no longer valid. Any intermediate station is responsible for decreasing this value. Typically a station would convert this to an absolute time, and convert it back to a relative

| Format of Message Segments | | | |
|---|---|---|---|
| Variable | Bit Pos | Bit Len | Description |
| Segment Type | 0 | 4 | Segment Type Message Fragments = 0x00 |
| Segment Type Acked | 4 | 4 | Segment Type being acked (used by Ack type Segment) |
| Destination ID | 8 | 32 | Destination ID of Message Fragment |
| Origin ID | 40 | 32 | Origin ID of Message Fragment |
| Message Number | 72 | 14 | Number of Message being sent 1->16 383 |
| Message Submission Number | 86 | 2 | Message Submission Number 0->3 |
| Message Size | 88 | 16 | Total Bytes in Message 0->65 535 (+1) |
| Fragment Start | 104 | 12 | Starting Message Fragment being sent 0->4 095 |
| Fragment End | 116 | 12 | Ending Message Fragment being sent 0->4 095 |
| Fragment Priority | 128 | 8 | 256 levels (0->255, 0 = Highest priority) |
| Fragment Time-To-Die | 136 | 24 | In Milliseconds 0->16 777 215 (4.66 hours) |
| Fragment Time-Of-Creation | 160 | 24 | In Milliseconds 0->16 777 215 (4.66 hours) |
| TxPowerReq for Origin ID | 184 | 8 | Tx Power Required to reach Origin ID |
| TxModemReq for Origin ID | 192 | 8 | Tx Modem Required to reach Origin ID |
| Segment Data | 200 | x | Rest of segment contains Message Fragments | time just before transmission. This removes the need for all clocks at all stations to be in sync.

Fragment Time-Of-Creation:
This is the original number of milliseconds a fragment had to live. This number is not changed. It is used by the destination and intermediate station to determine how long it took for a fragment to reach them from the Origin station.

Tx Power Req for Origin ID:
This is the combined Tx Power Required to reach the Origin ID from the station currently sending the segment.

Tx Modem Req for Origin ID:
This is the lowest modem number used at any intermediate station to reach the Origin ID from the station currently sending the segment.

Segment Data:
This contains the actual message fragments.

Hardware Description

FIGS. 4, 5, 6 and 7 show the basic hardware used to implement the method and system of the invention. These Figures correspond to FIGS. 8, 9, 10 and 11 of the above-mentioned international PCT patent application no. WO 96/19887. The following description relates particularly to aspects of operation of the hardware which are relevant to the present invention.

Based upon its "decision" to transmit, the main processor 149 will decide on a power level data rate and packet duration to use and will send this packet to the serial controller 131 and simultaneously through the peripheral interface 147 switch the transmit/receive switch 103 into transmit mode and switch the transmitter on after a suitable delay. The Zilog chip 131 will send the packet data together with a suitable header and CRC check via the PN sequence encoders in block 128 or 130, depending on the data rate chosen.

The main processor 149 will embed in the data packet, as one of the fields of information, data corresponding to the transmit power it is using, which will be the same transmit power as sent to the power control PIC block 132, which in turn is used to drive the power control circuit 141, which in turn controls the gain control and low pass filter block 143. This block in turn uses feedback from the power amplifier 145 to control the drivers 144 and 142.

The sensing and gain feedback method allows a reasonably accurate power level to be derived based upon the instruction from the power control circuit 141.

Prior to switching the power amplifier on, the transmission frequency is selected by the synthesizer 138, after which the power amplifier 145 is instructed via the driver block 141 and the amplifier is switched on.

If power levels below the minimum power level provided by the power amplifier 145 are required, the switched attenuator block 102 may be switched in, in order to provide up to an additional 40 dB of attenuation. Therefore the processor can instruct the power amplifier to switch in an attenuator combination to provide an output power level ranging from minus 40 dBm to plus 50 dBm. When the amplifier is switched on, the processor obtains information from the low power sensing circuit 101 as to the forward and reverse power, which is sent via the analogue to digital converter 146 and is used by the main processor 149 in order to monitor the level of power being transmitted. This information is then stored in the dynamic RAM 150 to provide information as to forward and reflected power levels actually generated by comparison to the level requested.

The amount of output transmit power will be affected by the efficiency of the transmit power control loop (blocks 145, 144, 142 and 143) and the switched attenuator block 102. In addition, any mismatch in the antenna 100 will also result in variations in reflected and forward power. The relative power actually output for various levels required can be stored by the processor in the RAM providing a table giving requested against actual power output levels. This can be used to allow the processor to use a more accurate power level field in the information it provides on future transmissions, within messages or probe signals. Since the power level is varied from between minus 40 dBm to plus 50 dBm there are effectively ten different power levels spaced 10 dB apart that may be transmitted. Therefore, the table stored by the processor will have these ten power levels, with the requested power level and actual power level being in this range.

Any other station in the network will then receive this transmission via its antenna 100. The received signal will then pass through the low power sensing circuit 101 and the switched attenuator 102, which initially is set for 0 dB attenuation. It will then pass through the 2 MHz bandpass filter 104, which will remove out of band interference, and then passes into the preamplifier 105, which amplifies the signal before it is mixed down via the mixer 106 to a 10.7 MHz IF signal. This signal is filtered by the bandpass filter 107, and amplified in the IF amplifier 108 and further filtered and amplified in blocks 109, 110, 111 and 112.

The final filtering occurs at blocks 114 and 115, at which stage the signal is measured at block 116 using the narrowband RSSI function, the output of which is used via the main processor to determine the signal strength of the incoming transmission. This then allows the processor, if necessary, to request the power control PIC circuit 132 to switch in additional receiver attenuation up to 40 dB. The switching in of additional attenuation in will only be necessary if the signal exceeds the measurement range of the NE615 of block 116. Otherwise, the attenuator is left at 0 dB attenuation, allowing the full sensitivity of the receiver to be available for receiving small signals. The incoming transmission is measured in two bandwidths simultaneously, namely 8 kHz and 80 kHz. The 80 kHz bandwidth is measured by tapping off the 10.7 MHz IF signal after the 150 kHz ceramic filter 109 and using a 150 kHz ceramic filter 121 and an NE604 IC 120. This, too, has an RSSI output which is received via the interface by the main processor 149.

The broadband and narrowband RSSI are measured via the analogue to digital converter 146, which then passes the data on to the main processor 149. The main processor has a lookup table, and takes the information from the A to D converter and derives from previously calibrated data a receive signal strength. This data is calibrated in dBm, typically from minus 140 dBm to 0 dBm. This information is typically generated using the output of a calibrated signal generator, injecting this into the input of the receiver, and then dialling up various signal strength levels and instructing the processor via the keyboard 209 as to what power levels are being injected. This information is then stored permanently in static RAM or flash RAM 150.

Therefore, the receiving station can accurately record the power level of any incoming transmission. It then reads the address of the incoming transmission and its embedded transmit power level. By comparing these, for example, a plus 40 dBm transmit power level may be measured in the receiver as minus 90 dBm and this is then used to compute a path loss of 130 dB. Path losses may vary from 0 dB up to a maximum of 190 dB (+50 −(−140)=190). The minimum path loss that can be measured is dependent on the transmission power of the transmitting station and the maximum signal that can be measured by the receiving station. Since with this design the maximum receiving signal is 0 dBm at the antenna port 100, a 0 dB path loss can be measured, providing the transmit power is less than 0 dBm. Otherwise, for example, at a transmit power of 50 dBm the minimum path loss that can be measured is 50 dB. This could be improved by adding additional steps in the switched attenuator or through using a different arrangement in the receiver. If the switched attenuator is fully switched in and the output of the A to D convertor indicates that the RSSI is at its highest level, the receiving processor will tag the data associated with the transmission as being "pegged". This means that the path loss is less than is measurable.

The processor on receive will continually measure the background signal and interference, and providing that no transmissions are detected on either modem at either data rate, will monitor and measure the noise and interference in dBm and generate an average which will be stored in the static RAM. When a transmission is detected, the most recent noise measurement is compared to the signal strength to derive a signal to noise ratio. On each transmission, the background noise picked up prior to transmission is advertised inside the transmission message or probe as another field together with the transmitted power. Other stations in the network can pick up and derive from transmission not only the path loss but also the distant station's noise floor just prior to its transmission. The receiving station, since it knows the path loss and has the noise floor of the distant station, will then know at what power to transmit to achieve any desired signal to noise ratio at the distant station.

The required signal to noise ratio is typically based upon the performance of the modem and a figure based upon packet duration and probability of success. This required signal to noise ratio is stored in the database by the processor and is continually updated, based upon the success of transmissions to various destinations. If a station, for example, picks up a transmission and calculates the path loss to be 100 dB and the distant station to have a declared noise floor of minus 120 dBm, to meet the required signal to noise ratio of for example, 20 dB for 8 kilobits per second, it will then transmit at a power level of minus 20 dBm. This required signal to noise ratio will be different for 80 kilobits per second in that the noise floor would be higher in the wider bandwidth of 150 kHz by comparison to 15 kHz and in that the performance of the 80 kilobits per second modem may be different from that of the 8 kilobits per second modem.

Therefore, the receiving station would know that if, for example, the declared noise floor in the wideband is minus 110 dBm and the path loss would still be 100 dB, but the required signal to noise ratio is, for example, 15 dB, it would require a transmission power of plus 5 dBm. The station receiving the transmission will know what power level to use to respond to the originating station.

Through the procedure outlined above a station can determine the required transmit power to reach its neighbouring stations. It will then include this required transmit power in the list of neighbouring stations that it places in its probes.

What is claimed is:

1. A method of operating a wireless communication network comprising a plurality of stations each able to transmit and receive data so that the network can transmit data from an originating station to a destination station via at least one opportunistically selected intermediate station, the method comprising:

a) defining at least one calling channel, distinct from at least one data channel, on which stations can transmit probe signals to other stations to which any station can respond, receive probe signals from other stations, and monitor probe signals transmitted by other stations;

b) selecting, at intervals, at each station and according to first predetermined criteria, a calling channel for the transmission of probe signals to other stations;

c) transmitting broadcast probe signals from each station at intervals on the selected calling channel, other stations which receive the broadcast probe signals from a given station responding directly, or indirectly via at least one intermediate station, to thereby indicate to the given station their availability as destination or intermediate stations; and d) evaluating, at the given station, the direct or indirect responses of other stations to said broadcast probe signals according to second predetermined criteria, in order to identify other stations with which the given station can communicate optimally.

2. A method according to claim 1 wherein the other stations receiving the probe signals from the given station each modify their own probe signals to include data indicating the quality of the communication between the given station and themselves, the given station being responsive to said data to vary at least one parameter of its transmissions so that it can communicate optimally with a desired number of other stations in the network without causing undue contention or interference between stations.

3. A method according to claim 1 wherein the probe signals from the given station include data identifying other stations which said given station has detected as being available as destination or intermediate stations.

4. A method according to claim 3 wherein the probe signals further include data indicating the quality of the communication between the given station and each other identified station.

5. A method according to claim 4 wherein the probe signals are broadcast probe signals addressed to all or a plurality of the other stations.

6. A method according to claim 5 wherein the probe signals additionally include addressed probe signals, addressed to at least one other station with which the station transmitting the addressed probe signals wishes to communicate.

7. A method according to claim 6 wherein the addressed probe signals are transmitted more frequently than the broadcast probe signals.

8. A method according to claim 6 wherein the addressed probe signals include age information corresponding to the age of the data indicating the quality of the communication between the given station and each other identified station, for use by the station receiving the addressed probe signals in selecting other stations with which to communicate.

9. A method of operating a communication network comprising a plurality of stations each able to transmit and receive data so that the network can transmit data from an originating station to a destination station via at least one intermediate station, the method comprising:

a) defining at least one calling channel, distinct from at least one data channel;

b) selecting, at intervals, at each station and according to first predetermined criteria, a calling channel for the transmission of probe signals to other stations;

c) transmitting probe signals from each station at intervals on the selected calling channel, other stations which receive the probe signals from a given station responding directly, or indirectly via at least one intermediate station, to thereby indicate to the given station their availability as destination or intermediate stations, wherein the probe signals from the given station include data identifying other stations which said given station has detected as being available as destination or intermediate stations, and further wherein the probe signals include power gradient information corresponding to a cumulative transmission power required for each identified station to reach those other identified stations with which said each identified station can communicate, for use by the station receiving the probe signals in selecting other stations with which to communicate; and d) evaluating, at the given station, the direct or indirect responses of other stations to said probe signals according to second predetermined criteria, in order to identify other stations with which the given station can communicate optimally.

10. A method according to claim 9 including transmitting chaser signals from an originating to a destination station, the chaser signals following multiple paths to the destination, thereby generating power gradient information usable by stations of the network in selecting a route for the transmission of data from the originating station to the destination station.

11. A method according to claim 10 including transmitting a gradient message from the destination station to the originating station, the power gradient message including data corresponding to the cumulative power required to transmit a data message from the originating station to the destination station via an optimum route.

12. A method according to claim 11 wherein all messages routed through the network include power gradient information corresponding to the cumulative transmission power required for the message to reach respective stations on its route through the network, thereby to permit optimised routing of messages through the network.

13. A method according to claim 1 wherein stations receiving probe signals from the given station respond by transmitting reply signals to the given station, the given station comparing the number of reply signals received from different stations with a predetermined value, and varying at least one parameter of its transmission if the number of reply signals does not correspond to the second value until the number of reply signals received by the given station corresponds to the predetermined value.

14. A method according to claim 13 including defining a plurality of calling channels, each calling channel except the first having a higher data rate than a previous calling channel and selecting a different calling channel having a different data rate from the previous calling channel according to the second predetermined criteria if the number of reply signals does not correspond to the predetermined value.

15. A method according to claim 14 wherein the first predetermined criteria include the calling channel data rate and/or the calling channel transmission power, the calling channel being selected according to the highest available channel data rate and/or the lowest available channel transmission power.

16. A method according to claim 14 wherein the second predetermined criteria include the calling channel data rate and/or the calling channel transmission power, the different calling channel being selected to have an incrementally lower channel data rate and/or an incrementally higher channel transmission power.

17. A method according to claim 13 wherein the predetermined value, which is compared with the number of reply signals, is calculated to correspond to a desired number of neighbor stations available to a given station as intermediate or destination stations, to permit the given station to communicate optimally with a desired number of other stations in the network without causing undue contention or interference between stations.

18. A method according to claim 1 including defining a plurality of data channels, each data channel except the first having a higher data capacity than a previous data channel, each station transmitting data to neighbour stations on selected data channels after determining the availability of said neighbour stations.

19. A method according to claim 18 wherein the data channels correspond to respective calling channels, a data channel being selected for transmission of data which corresponds to the selected calling channel.

20. A method according to claim 18 wherein a plurality of data channels correspond to a single calling channel, the data channels being monitored for activity by the stations and a station wishing to transmit data selecting a data channel which has been detected as free of activity, thereby to optimize data channel usage between stations.

21. A method according to claim 20 wherein probe signals transmitted by each station on the calling channels include information indicative of the intention of a given station transmitting said probe signals to move to a selected data channel which is then flagged as being active, to permit other stations to communicate successfully with the given station on the selected data channel.

22. A method according to claim 1 wherein probe signals are transmitted regularly by stations attempting to establish contact with other stations, other stations receiving the probe signals responding to a random number of the probe signals, said random number being equal to or less than the number of probe signals transmitted.

23. A method according to claim 22 including controlling, at each station, the interval between the transmission of probe signals by a probe timer, the probe timer defining an interval between successive probe signals which is longer than the duration of a probe signal, and transmitting response signals during periods between the successive probe signals.

24. A method according to claim 23 including varying the interval between the transmission of successive probe signals at each station according to whether or not the station has data to transmit, the probe timer defining a first, relatively short interval between successive probe signals when the station has data to send, and a second, relatively long Interval between successive probe signals when the station has no data to send.

25. A method according to claim 1 wherein stations are designated as important and these stations transmit probe signals Including data identifying them, other stations receiving these probe signals in turn modifying their own probe signals to include the data identifying the important stations, so that even stations remote from the important stations obtain said data.

26. A method according to claim 25 wherein the designated important stations include gateway stations, certification authority stations and, from time to time, originating or destination stations.

27. A method according to claim 1 including distributing updated software for the operation of the stations by uploading the updated software to a selected station, and distributing portions of the updated software to other stations until each other station has the complete updated software.

28. A method according to claim 27 wherein the updated software is distributed in update blocks including version data and block number data to permit stations to assemble the update software from a plurality of received update blocks.

29. A method according to claim 28 wherein at least one of the update blocks includes timing data indicating a date and time at which the updated software must be used.

30. A wireless communication network comprising a plurality of stations each able to transmit and receive data so that the network can transmit data from an originating station to a destination station via at least one opportunistically selected intermediate station, each of the stations operating in use to:

a) define at least one calling channel distinct from at least one data channel, on which stations can transmit probe signals to other stations to which any station can respond, receive probe signals from other stations, and monitor probe signals transmitted by other stations;

b) select, at intervals, according to first predetermined criteria, a calling channel or the transmission of probe signals to other stations;

c) transmit broadcast probe signals to other stations at intervals on the selected calling channel, other stations which receive the broadcast probe signals from a given station responding directly or indirectly, via at least one intermediate station, to thereby indicate to the given station their availability as destination or intermediate stations; and d) evaluate the direct or indirect responses of other stations to said broadcast probe signals according to second predetermined criteria, in order to identify other stations with which the given station can communicate optimally.

* * * * *